United States Patent
Suzuki et al.

(10) Patent No.: US 6,797,776 B1
(45) Date of Patent: Sep. 28, 2004

(54) THERMOPLASTIC RESIN COMPOSITION

(75) Inventors: Katsumi Suzuki, Kanagawa (JP);
Toshikazu Hoshina, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/913,332

(22) PCT Filed: Mar. 22, 2000

(86) PCT No.: PCT/JP00/01742

§ 371 (c)(1),
(2), (4) Date: Aug. 13, 2001

(87) PCT Pub. No.: WO01/46316

PCT Pub. Date: Jun. 28, 2001

(30) Foreign Application Priority Data

Dec. 21, 1999 (JP) ............................ 11-362413

(51) Int. Cl.$^7$ .............................................. C08L 53/00
(52) U.S. Cl. ...................................................... 525/98
(58) Field of Search ........................... 525/98, 240, 241

(56) References Cited

FOREIGN PATENT DOCUMENTS

| EP | 2004685 | | 10/1979 |
| EP | 1029876 | A1 | 8/2000 |
| GB | 2003891 | | 3/1979 |
| JP | 445140 | | 2/1992 |
| JP | 06-271717 | * | 6/1994 |
| JP | 6192502 | | 7/1994 |
| WO | A1-9313168 | | 7/1993 |

OTHER PUBLICATIONS

Junji et al, electronic translation of JP 06271717.*
Publication No. XP002267536, (JP 06 184366 A).
Publication No. XP002267537, (JP 06 345914 A).

* cited by examiner

Primary Examiner—Jeffrey Mullis
(74) Attorney, Agent, or Firm—Birch, Stewart, Kolasch & Birch, LLP

(57) ABSTRACT

Provided is a thermoplastic resin composition comprising (A) a styrene resin, (B) a propylene resin and (C) a hydrogenated block copolymer comprising at least two polystyrene blocks Xs and at least one polybutadiene block Y, with at least 70 wt. % of the double bonds of the polybutadiene of the polybutadiene block Y having been hydrogenated, wherein the hydrogenated block copolymer (C) has a styrene content of 40 to 80 wt. %; a 1,2-bound amount of the polybutadiene block Y is 30 to 80 wt. %; a weight ratio of the component (A) to the component (B) is 95:5 to 5:95; the component (C) is contained in an amount of 2 to 30 parts by weight based on 100 parts by weight of the components (A) and (B); and at least 50% of the component (C) exists at the interface between a phase of the component (A) and a phase of the component (B). Existence of this component (C) makes it possible to yield a thermoplastic resin composition having excellent heat resistance and oil resistance and having comparable tensile elongation properties.

8 Claims, 2 Drawing Sheets

THERMOPLASTIC RESIN COMPOSITION

This application is the national phase under 35 U.S.C. § 371 of PCT International Application No. PCT/J00/01742 which has an International filing date of Mar. 22, 2000, which designated the United States of America and was not published in English.

TECHNICAL FIELD

The present invention relates to a thermoplastic resin composition rich in heat resistance and oil resistance and excellent in tensile elongation properties.

BACKGROUND ART

Styrene resins are used widely as an injection molding material or sheet forming material because of its rigidity, good stability and low cost. They however have stress cracks under the influence of a fatty oil or organic solvent and undergo a drastic deterioration in physical properties. In addition, since they are amorphous and have a glass transition point of about 90° C., they easily change in shape at a relatively low temperature not greater than 90° C. These drawbacks prevent free use of them.

There has accordingly been an attempt to prepare a resin composition having improved oil resistance and chemical resistance by adding, to a styrene resin, a propylene resin having excellent oil resistance. Proposed in JP-A-54-53159 (The term "JP-A" as used herein means an "unexamined published Japanese patent application") and JP-A-54-13354 are compositions obtained by adding a compatibilizer to a composition of a styrene resin and a propylene resin, which have inherently difficulty in mixing, in order to improve their compatibility. For example, in JP-A-54-53159, proposed is a thermoplastic composition obtained from a polystyrene resin and a polyethylene or poly-α-olefin resin by using, as a compatibilizer, a selectively hydrogenated linear, sequential or radial teleblock copolymer which comprises a polymerized aromatic vinyl compound A and an olefin elastomer B and has a structure of A-B-A, A-(B-A-B)$_n$-A, A(BA)$_n$B, B(A)$_4$ or B[(AB)$_n$B]$_4$ (wherein, n stands for an integer of 1 to 10). In the block copolymer serving as a compatibilizer, a block of the polymerized aromatic vinyl compound preferably accounts for 15 to 40 wt. % of all the block polymers, the olefin elastomer B is preferably a hydrogenated saturated polybutadiene, and 30 to 50% of butadiene carbon atoms are vinyl side chains. As its specific example, an SEBS block copolymer having a 30 wt. % of a bound styrene content is disclosed. However, owing to a low content of the aromatic vinyl compound block, this block copolymer lacks affinity with a styrene resin. An amount of the block copolymer which can exist on the interface as a compatibilizer for the styrene resin and propylene resin is not sufficient so that the resulting composition is poor in tensile elongation properties. In JP-A-56-38338, on the other hand, proposed is a thermoplastic resin composition formed of a polyolefin resin and a polystyrene resin by using, as a compatibilizer, a hydrogenated block copolymer available by hydrogenating a block copolymer having at least one aromatic vinyl compound polymer block A and at least one conjugated diene polymer block B and containing 15 to 85 wt. % of a bound vinyl-substituted aromatic compound, thereby saturating at least 70% of double bonds in the block copolymer. In Examples, disclosed as a compatibilizer for a composition of a styrene resin and a propylene resin is A-B-A-B tapered 4 type hydrogenated block copolymers having a bound styrene content of 40 wt. % and a vinyl content, before hydrogenation, of 13%. These hydrogenated block copolymers involve drawbacks such as complex structure and cumbersome preparation process. There is accordingly a demand for a hydrogenated block copolymer which has a simple structure and can be prepared easily. In JP-A-5-186660 and JP-A-6-184366, proposed are resin compositions having excellent heat resistance, chemical resistance and oil resistance and formed from a rubber-modified styrene resin and a polyolefin resin by using, as a compatibilizer, a hydrogenated triblock copolymer which comprises a styrene block, isoprene block, and a styrene block, with these styrene blocks accounting for 40 to 70 wt. % of these blocks. The hydrogenated triblock copolymer having an isoprene block is however inferior in weather resistance and heat resistance and has a problem in recycling properties. In addition, these resin compositions are not always satisfactory in tensile elongation properties, because adhesion of the styrene resin phase and propylene resin phase on the interface therebetween is insufficient.

An object of the invention is to provide a thermoplastic resin composition rich in heat resistance and oil resistance and having excellent tensile elongation properties by adding, to a styrene resin and a propylene resin, a hydrogenated block copolymer having a specific structure.

DISCLOSURE OF THE INVENTION

The object of the invention has been achieved by a thermoplastic resin composition comprising (A) a styrene resin, (B) a propylene resin and (C) a hydrogenated block copolymer comprising at least two polystyrene blocks Xs and at least one polybutadiene block Y, with at least 70% of the double bonds of the polybutadiene of the polybutadiene block Y having been hydrogenated, wherein a styrene content of the hydrogenated block copolymer (C) is 40 to 80 wt. %, a 1,2-bound content of the polybutadiene block is 30 to B80 wt. %, a weight ratio of the component (A) to the component (B) is 95:5 to 5:95, a content of the component (C) is 2 to 30 parts by weight based on 100 parts by weight of the components (A) and (B), and at least 50% of the component (C) exists on the interface between the phase of the component (A) and the by phase of the component (B).

BEST MODE FOR CARRYING OUT THE INVENTION

Figure 1:
FIG. 1 illustrates a phase separation structure of a thermoplastic resin composition of Example 1 of the invention observed through a transmission electron microscope.

In the invention, examples of the styrene resin (A) include homopolymers or copolymers obtained using, as a monomer component, styrene, methylstyrene, ethylstyrene, isopropylstyrene, dimethylstyrene, paramethylstyrene, chlorostyrene, bromostyrene, vinyltoluene or vinylxylene, styrene-maleic anhydride copolymer, styrene-acrylic acid copolymer, styrene-acrylate copolymer, styrene-methacrylic acid copolymer, styrene-acrylonitrile copolymer and acrylonitrile-butadiene-styrene copolymer. In addition, an impact-resistant polystyrene resin obtained by mixing the above-described polystyrene resin with at least one of a butadiene rubber, ethylene-propylene rubber and a styrene butadiene rubber or graft polymerizing the latter on the former can also be used. The styrene resin of the invention has preferably a melt all index (MI: at 200° C. under a load of 5 Kg) of 0.5 to 20 g/10 min, more preferably 1 to 10 g/10 min.

In the invention, no particular limitation is imposed on the propylene resin (B) insofar as it is a polymer obtained by polymerizing a propylene monomer as a main component. A propylene resin obtained by copolymerizing with up to about 20 wt. % of another α-olefin such as ethylene, butene or 4-methylpentene-1 may be used. Either a random copolymer or block copolymer may be used. Moreover, a propylene resin may contain up to about 40 wt. % of an olefin thermoplastic elastomer such as a copolymer rubber with at least 2 α-olefins selected from ethylene, propylene, 1-butene, 1-hexene, 4-methyl-pentene and 1-octene or a copolymer rubber comprising an (α-olefin and various monomers. Typical examples of the copolymer rubber with the at least 2 α-olefins include ethylene-propylene copolymer rubber (EPR), ethylene-butene copolymer rubber (EBR) and ethylene-propylene-diene copolymer rubber (EPDM). In the invention, preferred as the propylene resin (B) is a syndiotactic polypropylene homopolymer or a propylene-ethylene block resin having a crystal-melting peak temperature by DSC of 155° C. or greater. Use of it heightens the heat deformation temperature of the resulting composition.

The propylene resin of the invention has preferably a melt flow rate (MFR, at 230° C. under a load of 2.16 Kg) of 0.5 to 60 g/10 min, more preferably 1 to 20 g/10 min. Melt flow rates less than 0.5 g/10 min deteriorate the moldability or formability of the resulting thermoplastic resin composition, while melt flow rates exceeding 60 g/min deteriorate impact resistance. Melt flow rates outside the above-described range are therefore not preferred.

In the invention, the hydrogenated block copolymer (C) comprises at least two polystyrene blocks Xs and at least one polybutadiene block Y, and has at least 70% of the double bonds of the polybutadiene of the polybutadiene block Y has been hydrogenated. The polystyrene block X may be a styrene homoblock or a block comprising styrene as a main component and 40 wt. % or less of another aromatic vinyl compound copolymerizable with styrene. Examples of the another aromatic vinyl compound include α-methylstyrene, 4-methylstyrene, 1,1-diphenylethylene and divinylbenzene. The polybutadiene block Y may be a butadiene homoblock or a block comprising butadiene as a main component and a 40 wt. % or less of another conjugated diene compound or aromatic vinyl compound copolymerizable with butadiene. Examples of the another conjugated diene compound copolymerizable with butadiene include isoprene, 2,3-dimethyl-1,3-butadiene, 1,3-pentadiene, 2-methyl-1,3-butadiene, 1,3-hexadiene, 4,5-diethyl-1,3-octadiene, 3-butyl-1,3-octadiene, myrcene and ocimene, while those of the aromatic vinyl compound include styrene, α-methylstyrene, 4-methylstyrene, 1,1-diphenylethylene and divinylbenzene.

The styrene content of the hydrogenated block copolymer (C) is 40 to 80 wt. %, preferably 45 to 80 wt. %. When the styrene content is less than 40 wt. %, the hydrogenated block copolymer (C) and the styrene resin lack affinity therebetween and the amount of the hydrogenated block copolymer existing on the interface between the styrene resin phase and the propylene resin phase becomes insufficient, resulting in unsatisfactory compatibilizing effects. When the styrene content exceeds 80 wt. %, on the other hand, the affinity with the styrene resin phase becomes excessive and the hydrogenated block copolymer is inevitably incorporated in the styrene resin phase, resulting also in unsatisfactory compatibilizing effects. When the hydrogenated block copolymer (C) contains another aromatic vinyl compound in addition to styrene, the styrene content means wt. % of all the aromatic vinyl compounds.

The 1,2-bound content of the butadiene unit of the polybutadiene block Y of the hydrogenated block copolymer (C) is 30 to 80 wt. %, preferably 40 to 80 wt. %. When the 1,2-bound content is less than 30 wt. %, the polybutadiene block and propylene resin after hydrogenation lack affinity therebetween, preventing the hydrogenated block copolymer from bringing about sufficient compatibilizing effects. When it exceeds 80 wt. %, on the other hand, the affinity with the propylene resin becomes excessive and the hydrogenated block copolymer is inevitably incorporated in the propylene resin phase, resulting in insufficient compatibilizing effects.

In the hydrogenated block copolymer (C), at least 70% of the double bonds of the polybutadiene of the polybutadiene block have been hydrogenated. Hydrogenation ratios less than 70% tend to lower elongation properties and heat resistance of the resulting composition.

It is preferred that the polystyrene block X of the hydrogenated block copolymer (C) has a weight-average molecular weight of 5000 to 50000, while the polybutadiene block Y has a weight-average molecular weight of 5000 to 70000. Weight-average molecular weights of the polystyrene block X not greater than 5000 lower the affinity with the styrene resin of the polystyrene block X, while weight-average molecular weights of the polybutadiene block Y not greater than 5000 lower the affinity with the propylene resin of the hydrogenated polybutadiene block Y, leading to inferior compatibilizing effects. When the weight-average molecular weight of the polystyrene block X is 50000 or greater or the weight-average molecular weight of the polybutadiene block Y is 70000 or greater, on the other hand, the molecular weight which becomes too large as the hydrogenated block copolymer causes an rise in the melt viscosity. Then, dispersion in the resin composition comprising a styrene resin and a propylene resin becomes insufficient, resulting in inferior compatibilizing effects.

The hydrogenated block copolymer (C) has preferably a melt flow rate (MFR, at 230° C. under a load of 2.16 Kg) of 0.1 to 50 g/10 min, more preferably 0.5 to 20 g/10 min, still more preferably 1 to 10 g/10 min. At a melt flow rate less than 0.1 g/10 min, the melt viscosity becomes too high, which makes it impossible to obtain sufficient compatibilizing effects. Melt flow rates exceeding 50 g/min, on the other hand, make it impossible to obtain reinforcing effects on the interface between the styrene resin and propylene resin.

In the invention, it is necessary that at least 50%, more preferably at least 60%, of the hydrogenated block copolymer (C) exists on the interface between the styrene resin (A) and the propylene resin (B). At an existing ratio less than 50%, even if the styrene resin and propylene resin form a mutually-impregnation phase separation structure, the resulting composition does not exhibit excellent tensile elongation properties because of inferior adhesion strength on their interface.

In the invention, the styrene resin (A) and propylene resin (B) are mixed at a weight ratio of 95:5 to 5:95. It is possible to adjust this composition ratio, for example, to increase the ratio of the styrene resin (A) when heightening of rigidity is intended, or to increase the ratio of the propylene resin when heat resistance and oil resistance are important. From the viewpoint of the balance between rigidity and heat resistance or oil resistance, a preferred weight ratio of the styrene resin (A) to the propylene resin (B) is 80:20 to 40:60.

The amount of the hydrogenated block copolymer (C) is 2 to 30 parts by weight, preferably 5 to 15 parts by weight, based on 100 parts by weight of the styrene resin (A) and propylene resin (B). Amounts less than 2 parts by weight cannot bring about sufficient compatibilizing effects. Amounts exceeding 30 parts by weight lower rigidity and in addition, are not economical.

In the invention, as the hydrogenated block copolymer (c), a triblock copolymer having an X-Y-X structure is preferably employed. In this case, the styrene content of the hydrogenated block copolymer (C) preferably exceeds 50 wt. % but not greater than 80 wt. %. The 1,2-bound content of the polybutadiene block Y of the hydrogenated block copolymer (C) is preferably 45 to 75 wt. %, more preferably 55 to 70 wt. %.

As one of preferred modes in the invention, the hydrogenated block copolymer (C) has an Y-X-Y-X or Y-X-Y-X-Y structure. In this case, the styrene content of the hydrogenated block copolymer (C) preferably exceeds 50 wt. % but not greater than 80 wt. %. The 1,2-bound content of the polybutadiene block Y of the hydrogenated block copolymer (C) is preferably 30 wt. % or greater but less than 60 wt. %.

No particular limitation is imposed on the preparation process of the hydrogenated block copolymer (C) and a known process is adopted. For example, a block copolymer comprising a polystyrene block X and a polybutadiene block Y can be prepared in an inert solvent by using a technique of living anionic polymerization in the presence of an organic lithium catalyst, which technique has been described in JP-B-36-19286. Described specifically, it can be prepared, for example, by successively forming blocks in the order of X, Y and X in the presence of, as an organolithium catalyst, a monolithium compound such as n-butyl lithium, sec-butyl lithium or tert-butyl lithium, by forming an X-Y two-type living block copolymer in the order of X and Y and then forming a triblock copolymer of an X-Y-X structure by using a bifunctional coupling agent, or by forming a triblock copolymer of an X-Y-X structure in the order of Y and X by using a dilithium compound.

The styrene content of the hydrogenated block copolymer (C) of the invention is adjusted by a feed monomer composition of styrene and butadiene. Upon polymerization, a polar compound or randomizing agent can be used for the purpose of adjusting a polymerization rate or changing the microstructure (cis, trans or 1,2-bound ratio) of the polymerized butadiene block.

Examples of the polar solvent or randomizing agent include amines such as N,N,N',N'-tetramethylethylenediamine, trimethylamine, triethylamine and diazobicyclo[2,2,2]octane, ethers such as tetrahydrofuran, diethylene glycol dimethyl ether and diethylene glycol dibutyl ether, thioethers, phosphines, phosphoramides, alkylbenzene sulfonates and alkoxides of potassium or sodium.

A hydrogenated block copolymer with at least 70% of the double bonds of the butadiene block having been selectively hydrogenated can be obtained by subjecting a solution of the block copolymer obtained above in a hydrocarbon solvent or a solution obtained by dissolving the block copolymer in a hydrocarbon solvent to hydrogenation reaction (which will hereinafter be called "hydrogenation"). The hydrogenation of the block copolymer solution may be conducted while the terminal is active or after inactivating the active terminal by a polymerization terminator.

As the catalyst to be used for hydrogenation, known are (1) a supported-type heterogeneous catalyst system and (2) a homogeneous catalyst using a Ziegler catalyst or a titanocene compound. In accordance with a process as described in JP-B-42-8704 or JP-B-43-6636, preferably a process as described in JP-B-63-441 or JP-B-63-5401, hydrogenation is conducted in the presence of a hydrogenation catalyst in an inert solvent, whereby a solution of a hydrogenated block copolymer is available.

By removing the solvent from the solution of a hydrogenated block copolymer thus obtained in a conventional manner, the hydrogenated block copolymer can be obtained. A step for deashing a metal can be adopted if necessary. A reaction terminator, antioxidant, neutralizing agent or surfactant may be used as needed.

To the thermoplastic resin composition of the invention, any additive can be added as needed. No particular limitation is imposed on the nature of the additive insofar as it is ordinarily employed for reparation of a resin. Examples include inorganic fillers such as silica, calcium carbonate, magnesium carbonate, calcium sulfate and talc, organic fibers, pigments such as titanium oxide, carbon black and iron oxide, lubricants or mold releasing agents such as stearic acid, behenic acid, zinc stearate, calcium stearate, magnesium stearate and styrene-bis-stearamide, plasticizers such as organopolysiloxane and mineral oils, antioxidants such as hindered phenol and phosphor antioxidants, flame retardants, ultraviolet absorbers, antistatic agents, and reinforcing agents such as glass fibers, carbon fibers and metal whisker; the other additives; and mixtures thereof.

No particular limitation is imposed on the preparation method of the resin composition of the invention insofar as it permits existence of at least 50% of the hydrogenated block copolymer (C) on the interface between the styrene resin (A) phase and propylene resin (B) phase. A known method can be utilized. Examples include a method of kneading components under a molten state in an ordinarily employed mixer such as Banbury mixer, single screw extruder, twin screw extruder, co-kneader or a multi screw extruder: or a method of dissolving or dispersing components in a solvent and then removing the solvent by heating. Preferred is a method of kneading under conditions permitting a shear rate of at least 100 sec$^{-1}$ at 180° C. or greater, preferably 200° C. or greater, under which the styrene resin (A) phase, propylene resin (B) phase and the hydrogenated block copolymer (C) can be mixed and melted sufficiently and the hydrogenated block copolymer (C) moves to the interface between the styrene resin (A) phase and the propylene resin (B) phase. Use of a twin screw extruder is preferred. The components are preferably kneaded once by the above-described method to form master pellets, followed by molding or forming and, if necessary, expansion molding.

Next, Examples in order to illustrate the present invention in greater detail are shown below, but the invention should not be construed as being limited thereto. The values shown in these Examples were measured by the methods described below. In Examples, the "part" and "%" is in terms of weight unless otherwise particularly indicated. Measurements in Examples were conducted in accordance with the following methods.

(1) Styrene content: measured by infrared spectroscopy based on the absorption of a phenyl group at 679 cm$^{-1}$.
(2) 1,2-Bound content of the polybutadiene block: by measured by infrared spectroscopy and calculated from Hampton method.
(3) Hydrogenation ratio: calculated from 100-MHz 1H-NMR spectrum by using ethylene tetrachloride as a solvent.
(4) Weight-average molecular weight: measured using gel permeation chromatography (GPC) at 40° C. in a THF solvent.

(5) Tensile elongation properties: A tensile elongation at break of injection-molded test piece of a resin composition was measured in accordance with ASTM D638 and it was used as an index.
(6) Rigidity: Flexural modulus of an injection molded test piece of a resin composition was measured by a three-point bending test in accordance with ASTM D790 and it was used as an index.
(7) Heat resistance: A vicat softening point of an injection molded test piece of a resin composition was measured under a load of 1 kgf in accordance with ASTM D5125 and it was used as an index.
(8) Oil resistance: A resin composition was formed into a sheet of 1 mm thick by a sheet extruder. By using the sheet, a container of 2 cm in height×10 cm in length×10 cm in width was formed. After application of a synthetic coconut oil to the inside surface of the container, it was heated in an oven for 1 hour. A heating temperature at which a changing ratio of the internal volume of the container by the above-described heating became 10% or greater was used as an index.
(8) Phase separation structure: From an injection molded piece of a resin composition, an ultra-thin section was cut out along a face parallel with a flow direction, upon molding or forming, of the resin by an ultra-microtome and it was stained with ruthenium tetraoxide. From the observation of the image at 25000× magnification under a transmission electron microscope, the phase separation structure of the styrene resin phase and propylene resin phase was observed.
(10) Existing ratio of block copolymer on the interface (a ratio of the hydrogenated block copolymer existing on the interface between the styrene resin phase and the propylene resin phase was measured and calculated based on the total amount of the hydrogenated block copolymer by the below-described method and it was used as an index): An image obtained by the above-described observation (9) of the phase separation structure under a transmission electron microscope was photographed. Based on the analysis of this photographed image, an area of the hydrogenated block copolymer existing in the styrene resin phase or propylene resin phase was measured and its ratio (a) to the whole area subjected to image analysis was calculated. Supposing that a weight ratio of the hydrogenated block copolymer calculated from the mixing ratio of the resin composition was (b), a ratio (c) of the hydrogenated block copolymer existing on the interface between the styrene resin phase and propylene resin phase was ((b)−(a)))/(b)×100%. This ratio was used as an index.

EXAMPLES 1 TO 8 AND COMPARATIVE EXAMPLES 1 TO 4

At a temperature maintained at 50° C., an autoclave having a content volume of 5 liter and equipped with a stirrer and a jacket was fed with 250 g of styrene and 1250 g of cyclohexane which had been purified in advance. Polymerization was initiated by adding thereto 0.5 g, in terms of butyl lithium, of a hexane solution of butyl lithium. One hour after the addition of the catalyst, 250 g of butadiene and 1250 g of cyclohexane, which had been purified and dried in advance, were added and they were polymerized at 50° C. After one hour, 250 g of styrene and 1250 g of cyclohexane were added and polymerization was conducted for 1 hour. Upon polymerization, tetramethylethylene diamine was added to regulate the 1,2-bound content of the polybutadiene block moiety.

The resulting block copolymer solution was diluted with cyclohexane to a concentration of 5 wt. %. To the diluted block copolymer solution, 1.175 g, in terms of nickel, of a hexane solution of nickel octenoate and 6.85 g, in terms of triethyl aluminum, of a hexane solution of triethyl aluminum were added as a catalyst. The resulting mixture was reacted at 50° C. for about 6 hours under hydrogen pressure. The resulting hydrogenated block copolymer solution was washed three times with an aqueous hydrochloric acid solution. From the thus-washed hydrogenated copolymer solution, the hydrogenated copolymer was precipitated using excess methanol. The precipitate was dried under reduced pressure. The resulting hydrogenated block copolymer (I) was found to have a styrene content of 67%, a 1,2-bound content of the polybutadiene block of 41%, and a hydrogenation ratio of 97%.

In a similar manner, hydrogenated block copolymers (I) to (VII) having a structure as described in Table 1 were prepared.

TABLE 1

| Structure of hydrogenated copolymer | I | II | III | IV | V | VI | VII |
| --- | --- | --- | --- | --- | --- | --- | --- |
| Block structure | X-Y-X | X-Y-X | X-Y-X | X-Y-X-Y | X-Y-X | X-Y-X | X-Y-X |
| Styrene content | 67% | 70% | 50% | 67% | 35% | 66% | 67% |
| Molecular weight of polystyrene block X | 15000 | 15000 | 16000 | 15000 | 10000 | 15400 | 15000 |
| 1,2-bound content of polybutadiene block Y | 40% | 65% | 40% | 40% | 41% | 20% | 40% |
| Molecular weight of polybutadiene block Y | 15000 | 13000 | 32000 | 75000 | 37000 | 14500 | 15000 |
| Hydrogenation ratio of polybutadiene block Y | 97% | 98% | 97% | 97% | 96% | 96% | 20% |

Seven hydrogenated block copolymers thus obtained were each mixed with a commercially available impact-resistance styrene resin (HIPS, "SR500", product of Dainippon Ink & Chemicals, Inc.), styrene resin (GPPS, "G9305", product of A & M styrene Co., Ltd.) or acrylonitrile-butadiene-styrene resin (ABS, "A4130", product of Asahi Kasei Corporation) and a block propylene resin (b-PP, "K7019", product of Chisso Corporation) at a ratio as shown in Table 2 or 3, followed by mixing for about 10 minutes in a super mixer. The resulting mixture was kneaded under a molten state at 210 to 230° C. in a 30-mmØ twin screw extruder, whereby a composition was obtained in the form of pellets. These pellets were measured for various properties. Composition ratios and measuring results are shown in Tables 2 and 3.

TABLE 2

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Structure of hydrogenated block copolymer | I | I | I | I | II | III | IV | I |
| Hydrogenated block copolymer (parts) | 6 | 15 | 6 | 10 | 6 | 6 | 6 | 15 |
| HIPS (wt. %) | 70 | 70 | 50 |  | 70 | 70 | 70 |  |
| GPPS (wt. %) |  |  |  | 70 |  |  |  |  |
| ABS (wt. %) |  |  |  |  |  |  |  | 70 |
| b-PP (wt. %) | 30 | 30 | 50 | 30 | 30 | 30 | 30 | 30 |
| Elongation at break (%) | 120 | 180 | 300 | 100 | 240 | 100 | 130 | 100 |
| Heat deformation temperature (° C.) | 107 | 107 | 112 | 107 | 109 | 106 | 107 | 105 |
| Flexural modulus (kgf/cm$^2$) | 17800 | 16400 | 15600 | 22000 | 17200 | 16600 | 17300 | 15400 |
| Oil resistance (° C.) | 105 | 103 | 115 | 105 | 109 | 102 | 108 | 110 |
| Phase separation structure | Mutual impregnation | Mutual impregnation | Mutual impregnation | Mutual impregnation | Mutual impregnation | Mutual impregnation | Mutual impregnation | Mutual impregnation |
| Existing ratio (%) of block copolymer on interface | 85 | 70 | 95 | 83 | 90 | 70 | 87 | 67 |

TABLE 3

|  | Comp. Ex. 1 | Comp. Ex. 2 | Comp. Ex. 3 | Comp. Ex. 4 |
|---|---|---|---|---|
| Structure of hydrogenated block copolymer | — | V | VI | VII |
| Hydrogenated block copolymer (parts) | 0 | 6 | 6 | 6 |
| HIPS (wt. %) | 70 | 70 | 70 | 70 |
| b-PP (wt. %) | 30 | 30 | 30 | 30 |
| Elongation at break (%) | 3 | 15 | 30 | 21 |
| Heat deformation temperature (° C.) | 106 | 106 | 107 | 108 |
| Flexural modulus (kgf/cm$^2$) | 19000 | 15800 | 16500 | 14000 |
| Oil resistance (° C.) | 70 | 81 | 86 | 83 |
| Phase separation structure | sea-island | Mutual impregnation | Mutual impregnation | Mutual impregnation |
| Existing ratio (%) of block copolymer on interface | — | 30 | 45 | 40 |

Figure 2:
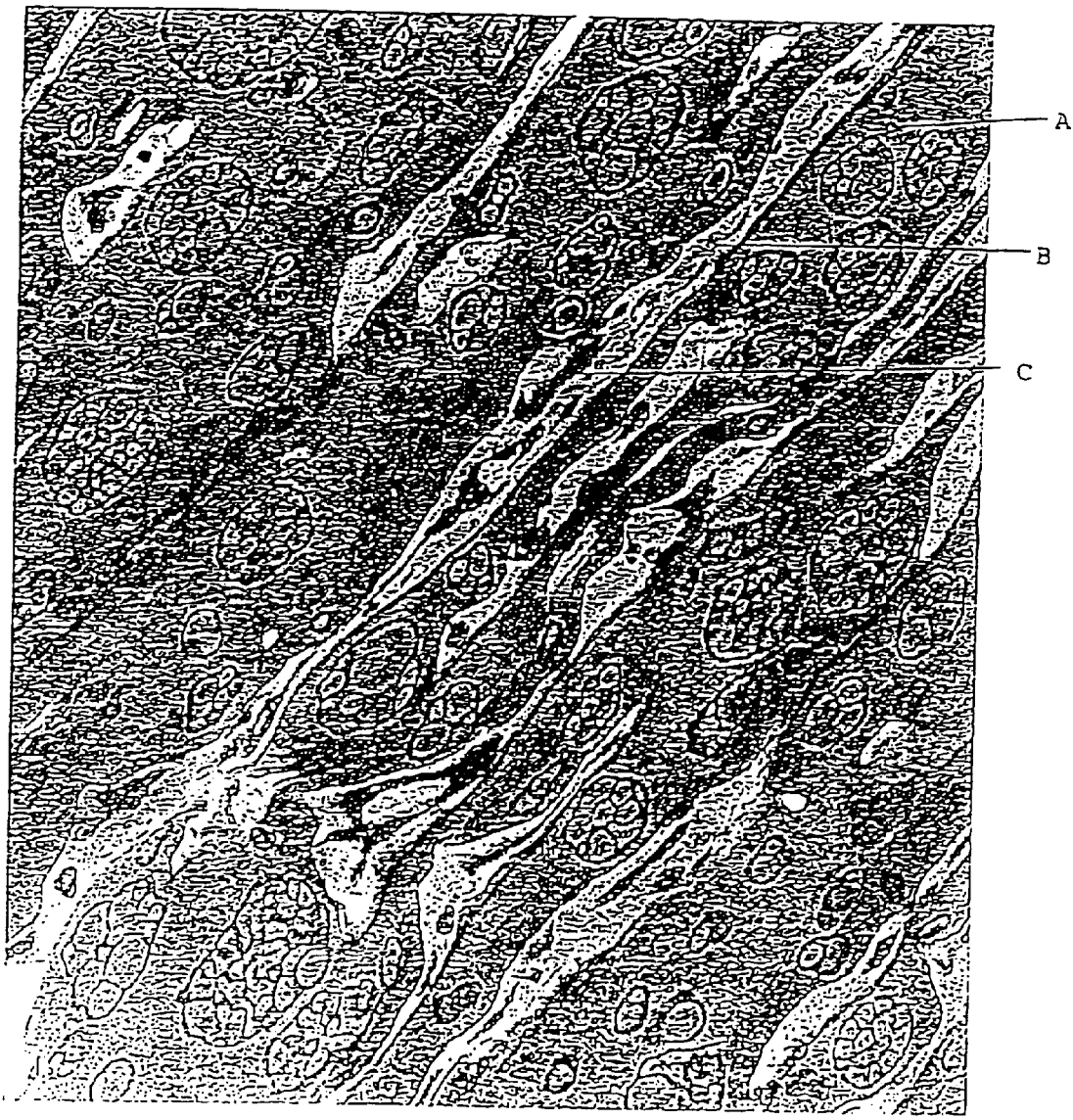
FIG. 2 illustrates a phase separation structure of a thermoplastic resin composition of Comparative Example 2 observed through a transmission electron microscope.

Phase separation structure of each of the thermoplastic resin compositions of Example 1 and Comparative Example 2 observed under a transmission electron microscope are shown in FIGS. 1 and 2, respectively. In FIG. 2, a number of hydrogenated block copolymers are dispersed in the propylene resin phase (the unstained light phase), while hydrogenated block copolymers scarcely exist on the interface between the styrene resin phase (the stained dark phase) and the propylene resin phase.

Compositions obtained in Examples of the invention all exhibited satisfactory results in any item.

In Comparative Example 1 free of a hydrogenated block copolymer, tensile elongation properties are inferior and oil resistance is insufficient. In Comparative Example 2 wherein the styrene content in the hydrogenated block copolymer is too small, the hydrogenated block copolymer has excessive affinity with the propylene resin, increasing the existing ratio of the hydrogenated block copolymer in the propylene resin phase. This means that the amount of the hydrogenated block copolymer is not enough for reinforcing the adhesion on the interface between the styrene resin phase and propylene resin phase, resulting in inferior tensile elongation properties and oil resistance. In Comparative Example 3, since the 1,2-bound content of the polybutadiene block of the hydrogenated block copolymer is too small, the affinity with the propylene resin lowers, leading to an increase in the existing ratio of the hydrogenated block copolymer in the styrene resin phase. This makes the adhesion on the interface insufficient, whereby tensile elongation properties and oil resistance become inferior. In Comparative Example 4, a hydrogenation ratio of the hydrogenated block copolymer becomes too small and affinity with the propylene resin lowers, so that the existing ratio of the hydrogenated block copolymer on the interface becomes insufficient, resulting in inferior tensile elongation properties and oil resistance.

INDUSTRIAL APPLICABILITY

The hydrogenated block copolymer (C) to be used in the invention exists on the interface between a styrene resin phase and a propylene resin phase and reinforces this interface, which makes it possible to provide a thermoplastic resin composition having excellent heat resistance and oil resistance and having incomparable tensile elongation properties.

What is claimed is:

1. A thermoplastic resin composition comprising:

(A) a styrene resin;

(B) a propylene resin; and (C) a hydrogenated block copolymer comprising at least two polystyrene blocks X and at least one polybutadiene block Y, with at least 70% of the double bonds of the polybutadiene of the polybutadiene block Y having been hydrogenated, wherein the hydrogenated block copolymer (C) has a styrene content of 45 to 70 wt. %, a 1,2-bound content of the polybutadiene block Y is 30 to 65 wt. %, a weight ratio of the component (A) to the component (B) is 95:5 to 5:95, a content of the component (C) is 2 to 30 parts by weight based on 100 parts by weight of the components (A) and (B), and at least 50% of the component (C) exists at the interference between a phase of the component (A) and a phase of the component (B).

2. The thermoplastic resin composition according to claim 1, wherein in the component (C), the polystyrene block X has a weight average molecular weight of 5000 to 50000, and the polybutadiene block Y has a weight average molecular weight of 5000 to 70000.

3. The thermoplastic resin composition according to claim 1, wherein a weight ratio of the component (A) to the component (B) is 80:20 to 40:60.

4. The thermoplastic resin composition according to claim 2, wherein a weight ratio of the component (A) to the component (B) is 80:20 to 40:60.

5. The thermoplastic resin composition according to claim 1, wherein the component (C) is a triblock copolymer having an X-Y-X structure.

6. The thermoplastic resin composition according to claim 5, wherein the styrene content of the component (C) is exceeding 50 wt. % but not greater than 80 wt. %.

7. The thermoplastic resin composition according to claim 1, wherein the component (C) is a block copolymer having an X-Y-X-Y structure or Y-X-Y-X-Y structure.

8. The thermoplastic resin composition according to claim 7, wherein the 1,2-bound content of the polybutadiene block Y of the component (C) is at least 30 wt. % but less than 60 wt. %, and the styrene content of the component (C) is exceeding 50 wt. % but not greater than 80 wt. %.

* * * * *